3,755,488
SELECTIVE ABSORPTION AND HYDROGENA-
TION OF ACETYLENES
Marvin M. Johnson and Gerhard P. Nowack, Bartles-
ville, Okla., assignors to Phillips Petroleum Company
No Drawing. Filed Jan. 3, 1972, Ser. No. 215,168
Int. Cl. C07c 11/72
U.S. Cl. 260—677 A                10 Claims

ABSTRACT OF THE DISCLOSURE

A manufacturing method for the purification and production of olefins through selective absorption of acetylenes impurities with a liquid absorbent and hydrogenating the resulting acetylenes-enriched liquid absorbent with a Group VIII catalyst, converting thereby the acetylenes to monoolefins having the same number of carbon atoms per molecule as the converted acetylenic compound.

---

The invention relates to a method for purifying olefin concentrate through the selective absorption of acetylenes. In another aspect, the invention relates to a method for producing monoolefins from a catalytic hydrogenation of the acetylenes contained in the liquid phase absorbent.

Monoolefins in recent years have been found to be of increasing importance in the petrochemical industry. For example, ethylene is frequently used as a chemical intermediate in the preparation of such materials as acetaldehyde, acetic acid, ethanol, ethylene glycol, ethylene oxide, etc. By far the largest use of ethylene, however, both present and prospective, lies in the polymerization field and specifically in the catalytic polymerization of ethylene to normally solid polymers. Ethylene, while naturally occurring in petroleum, is obtained principally by the dehydrogenation and/or cracking of low-boiling paraffin hydrocarbons such as ethane, propane, butane, etc. In the process of manufacture of ethylene from paraffins, various side products are formed in small quantities. These include such materials as acetylene, carbon monoxide, carbon dioxide and oxygen. Due to the sensitivity of the various polymerization catalysts to these materials, it is desirable when utilizing ethylene as a feed material in the polymerization process to first remove side products such as acetylene.

The removal of acetylenes from olefins, for example acetylene from ethylene, has required multiple treatment steps involving substantial expenditure of thermal energy. Frequently, due to the poor economy of these known processes, acetylene-ethylene mixtures are flared as vent gases. On a full-scale manufacturing operation volume, these acetylene-ethylene flared vent gases can amount to several hundred thousand s.c.f. per day. It is therefore apparent that these known means for purifying ethylene and/or other olefins from acetylenes waste potentially several thousand pounds of olefin production per day.

It is an object of this invention to provide an improved method for separating acetylenes from olefins and converting the acetylenes to monoolefins having the same number of carbon atoms per molecule as the converted acetylenic compound. It is another object of this invention to provide a process for increasing the overall production efficiency in an olefin manufacturing process.

The foregoing objects are obtained broadly in the operation of an olefin manufacturing process by the direct hydrogenation of the acetylenes absorbed in a liquid solvent to the corresponding monoolefin and recycle of the absorbent. Mixtures of olefins and acetylenes in addition to ethyleneacetylene, such as propylene-methylacetylene and butenes-ethyl-acetylene, vinylacetylene, or diacetylene can be treated according to the method of the invention. For purposes of simplicity, the invention will be discussed in accordance with the treatment of an acetylene-ethylene mixture.

It has been determined that through the method of the invention, rapid hydrogenation of acetylene dissolved in an absorbent is possible in the presence of a Group VIII metal catalyst. Suitable absorbents can be broadly described as aprotic polar solvents in which acetylenes have a high solubility and which do not inactivate Group VIII metal-containing hydrogenation catalysts. Specific examples of these absorbents are dimethylformamide, N-methylpyrrolidone, hexamethylphosphoramide, N-methyl-piperidone, dimethylacetamide, sulfolane, and the like and mixtures thereof. Due to its effectiveness as a selective solvent for acetylene and for its compatibility with hydrogenation catalysts, the preferred absorbent is dimethylformamide.

Group VIII metal hydrogenation catalysts are known in the art, and they have been prepared in numerous ways such as by impregnating an absorbent support with a noble metal salt solution and then evaporating the solution of said salt in the presence of the support. Another method involves precipitation of, for example, palladium hydroxide in the presence of an inert support by adding a palladium chloride solution to a hot solution of sodium carbonate in which the support is suspended. The catalysts prepared by these known methods are active hydrogenation catalysts but, since their use does not result in high hydrogenation rates when used with low-concentration feeds, the various Group VIII metals differ in their overall effectiveness as to the method of hydrogenating acetylene in the presence of an absorbent. These catalysts need not be insoluble in the absorbent-solvent but can also be completely soluble as well as being colloidally dispersed. Examples of these solid (insoluble) catalysts are Raney nickel, ruthenium on alumina, palladium on alumina, nickel arsenide on alumina, and the like and mixtures thereof. Examples of soluble or semisoluble catalysts are the reaction product of nickel chloride and triethylaluminum; ferric chloride, tetrahydrofuran, and triethylaluminum; and the like, and mixtures thereof. The preferred catalyst, according to the method of the invention and the results as illustrated in the table hereinbelow, contains palladium in the range of 0.01 to about 10 percent by weight of the total catalyst, with alumina constituting the support for the palladium. The catalyst system utilized in the method of selectively hydrotreating absorbed acetylene to ethylene also must provide a high conversion rate to be economically feasible.

The hydrotreating process of the present invention can be carried out at temperatures in the range of from about 50 to about 300° F., preferably 100 to 250° F. The pressure within the reaction zone can vary from about 0 to about 2000 p.s.i.g. but will be sufficient to maintain the acetylene-enriched dimethylformamide in liquid phase while in the reaction zone. The process can be conducted continuously or batchwise, and any convenient contacting apparatus can be used. Hydrogen can be present in the reaction zone in concentrations ranging from the minimal amount required to react with all the components to be hydrogenated or in amounts greatly in excess of this value. Frequently, the hydrogen is present in amounts ranging from about 1 to about 100 mols of hydrogen per mol of total acetylene present.

The quantity of catalyst present in the reaction zone can vary over a wide range and can be an important control over the rate of reaction. Because both soluble and insoluble catalysts can be used, a wide variety of reaction procedures and reactor types can be employed. Both batchwise and continuous reaction systems can be used. In batch systems, sufficient catalyst is present to provide the desired conversion within the desired reaction time. Generally, the amount of catalyst present will be in the range of from about 0.001 to about 0.1 part of catalyst per part of absorbent solution, by weight. Reaction times can vary from about 1 minute to about 5 hours, preferably 2 to 60 minutes.

In continuous operations, the acetylenes-rich absorbent liquid is continuously passed through a reaction zone at a rate sufficient to achieve the desired degree of conversion. Generally, the residence time in such reaction zone will range from about 0.1 second to about 1 hour. A particularly effective continuous reactor is the trickle-bed reactor. In one mode of operation, the acetylenes-containing absorbent is passed downwardly through a column packed with a solid hydrogenation catalyst. The column contains pressurized hydrogen as a continuous phase and the liquid essentially trickles downward over the catalyst. The rate is such that the acetylenes are essentially completely converted by the time they reach the bottom of the catalyst-packed column. In another mode of continuous operation, a similar column is packed with an inert packing material such as alundum, glass or ceramic packing and the like. The acetylenes-containing absorbent liquid, which in this case also contains an effective amount of dissolved or dispersed hydrogenation catalyst in amounts described above for batch reactions, is passed downwardly, in a trickle phase, at a rate such that the acetylenes are essentially converted by the time they reach the bottom of the reaction zone.

After the completion of the reaction period, or after the reaction mixtures leaves the reaction zone, the reaction mixture can be subjected to separation operations and to recovery of desired product using any conventional and suitable means. Suitable means would, of course, contain a normal stripping of the dimethylformamide solvent of a polymerization purity ethylene. In one mode of operation, for example, the reactor effluent can be separated using filtration and distillation techniques to isolate and recover the catalyst for recycle to the reaction zone. In still another mode of operation, the desired hydrotreated product can be continuously removed from the reaction zone while fresh feed is continuously introduced into the zone. Fresh catalyst also can be introduced in this manner while a small stream containing spent catalyst can be continually rejected from the reaction zone. The catalyst of the invention can best be recycled and reused for long periods up to the point it is inactive or destroyed by catalyst poisons and feed or system.

The following example and table illustrate the method of the invention and the results achieved thereby. Three Group VIII metal catalysts were deployed according to the inventive method and included (1) a 0.5 weight percent ruthenium promoter on an alumina base, (2) commercial Raney nickel and (3) a 5 percent palladium promoter on alumina support.

EXAMPLE

Acetylene was absorbed in dimethylformamide at room temperature and one atmosphere pressure. The saturated solution was then placed in a one-liter autoclave and hydrogenated at 100 p.s.i.g. hydrogen pressure and 100° F. The hydrogenation catalyst consisted of a 5 percent by weight palladium on alumina support and was present at a concentration of $1\times10^{-2}$ grams per milliliter of dimethylformamide. The other aforementioned catalysts were utilized as indicated in the table hereinbelow, which also illustrates the results of the above-mentioned palladium catalyst as to conversion and selectivity.

TABLE

| Catalyst | 0.5% Ru on $Al_2O_3$ | Raney nickel | Raney nickel | 5% Pd on $Al_2O_3$ |
|---|---|---|---|---|
| Catalyst concentration, gm./ml. dimethylformamide | $1\times10^{-2}$ | $5\times10^{-3}$ | $2.5\times10^{-2}$ | $1\times10^{-2}$ |
| Temperature, ° F | 250 | 100 | 37 | 100 |
| Pressure, p.s.i.g | 100 | 100 | 100 | 100 |
| Time (hours) | 2 | 2 | ⅙ | 1/10 |
| Conversion, percent | 6 | 98 | 96 | 93 |
| Selectivity to $C_2H_4$, percent | 79 | 67 | 67 | 95 |

The results illustrated in the table above demonstrate several applicable catalysts which can be used according to the method of the invention. The palladium on alumina is shown to be the most effective of the group. The results further demonstrate the feasibility of selective hydrogenation of an acetylenes-enriched dimethylformamide absorbent to produce ethylene which can be recovered.

Reasonable variations and modifications are possible within the scope of the foregoing disclosure and the claims to the invention without departure from the spirit thereof.

That which is claimed is:

1. A method of olefin recovery which comprises:
    (a) contacting an olefin stream containing acetylenes with a liquid, aprotic, polar solvent absorbent selected from materials in which acetylenes have a high solubility and which do not inactivate Group VIII metals to selectively absorb acetylenes therefrom and produce an acetylene-enriched absorbent phase;
    (b) contacting said acetylene-enriched absorbent phase with hydrogen and a supported catalyst comprising a metal of Group VIII under hydrogenation conditions including a pressure sufficient to maintain said acetylene-enriched absorbent phase in the liquid phase and sufficient to hydrogenate at least a portion of the acetylenes contained in said absorbent phase to monoolefins; and
    (c) recovering said monoolefins thus produced from said absorbent phase leaving an absorbent phase substantially freed of acetylenes and monoolefins which can be recycled to step (a) for further use in the process.

2. A method according to claim 1 wherein the liquid, aprotic, polar solvent absorbent is selected from the group consisting of dimethylformamide, N-methylpyrrolidone, hexamethylphosphoramide, N-methylpiperidone, dimethylacetamide, and sulfolane.

3. A method according to claim 2 wherein the olefin concentrate is comprised of ethylene and the absorbent is dimethylformamide.

4. A method according to claim 3 wherein the Group VIII metal catalyst is selected from the group consisting of ruthenium, nickel, and palladium.

5. A method according to claim 4 wherein the Group VIII metal catalyst is palladium supported on alumina.

6. A method according to claim 3 wherein the hydrogenation temperature varies from about 50 to about 300° F.; the hydrogenation pressure varies from about 50 to about 150 p.s.i.g.; and the hydrogenation catalyst concentration varies from about $1\times10^{-3}$ to about $2\times10^{-2}$ grams per milliliter of dimethylformamide contacted.

7. The method of claim 1 wherein said absorbent is dimethylformamide and said supported catalyst comprises palladium on alumina.

8. The method of claim 7 in which said catalyst comprises about 5 weight percent palladium on alumina.

9. The method of claim 8 in which said catalyst is employed in a concentration equivalent to about $1\times10^{-2}$ gram per milliliter of said dimethylformamide.

10. The method of claim 9 in which said absorbent is maintained in the liquid phase during said contact with said catalyst.

(References on following page)

References Cited

UNITED STATES PATENTS

| | | | |
|---|---|---|---|
| 3,272,885 | 9/1966 | Davison | 260—677 A |
| 2,917,563 | 12/1959 | Dye | 260—677 A |
| 3,549,720 | 12/1970 | Wright et al. | 260—677 |
| 3,420,618 | 1/1969 | Fleming | 260—677 |
| 3,424,809 | 1/1969 | Johnston | 260—677 |
| 2,942,042 | 6/1969 | Folz | 260—677 |

DELBERT E. GANTZ, Primary Examiner

J. M. NELSON, Assistant Examiner

U.S. Cl. X.R.

260—677 R